Aug. 26, 1958    C. L. THOMPSON    2,849,147
GASOLINE TANK WITH ANTI-SPLASH CLOSURE
Filed Feb. 26, 1954
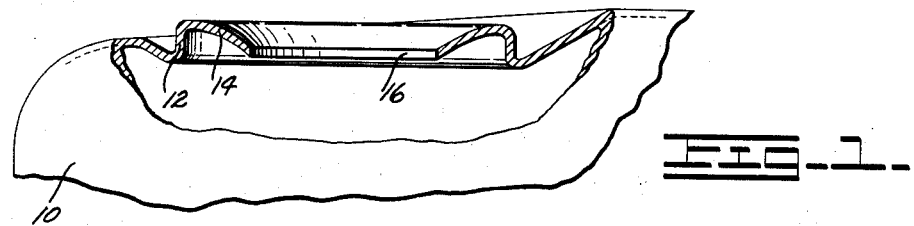
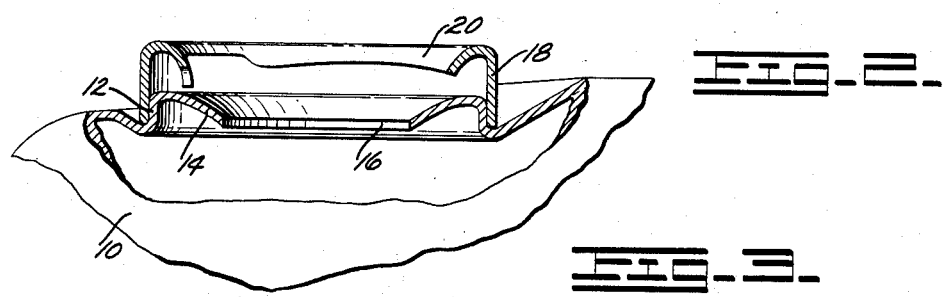
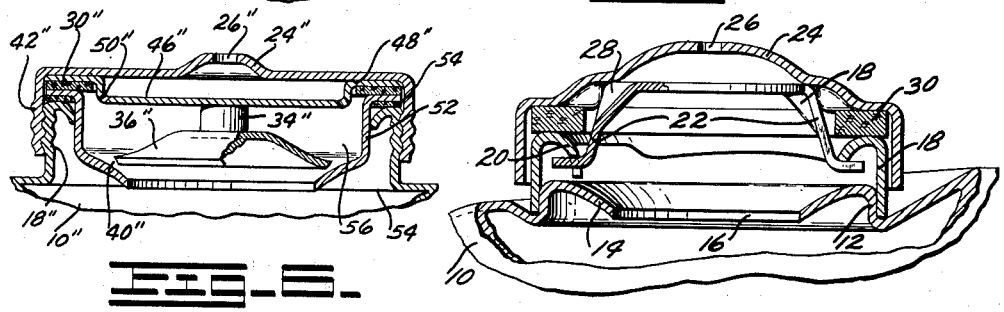
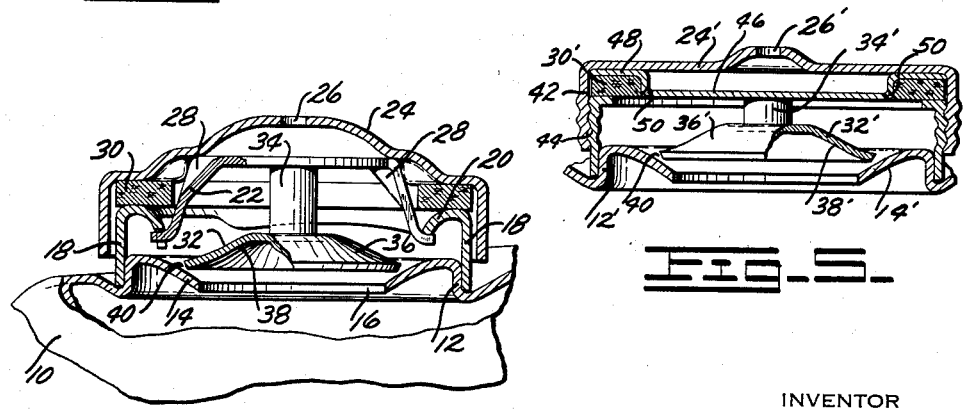
INVENTOR
Clyde L. Thompson
BY
ATTORNEY United States Patent Office 2,849,147
Patented Aug. 26, 1958

2,849,147

GASOLINE TANK WITH ANTI-SPLASH CLOSURE

Clyde L. Thompson, Michigan Center, Mich.

Application February 26, 1954, Serial No. 412,776

5 Claims. (Cl. 220—44)

This invention relates to fuel tanks and like containers and to anti-splash closures employed in connection with the tank openings through which the tanks are capable of being filled with fuel or other liquid. In particular, the invention is concerned with the relatively small size fuel tanks employed upon portable power driven apparatus, such as lawn mowers, and in connection with which the objection exists, with the closure devices as at present employed, that the fuel spills over through the air bleed hole in the closure cap during movement of the lawn mower over uneven ground, for example, and due to the fuel tank (which is commonly mounted directly upon the engine or prime mover) being subjected to sudden shock or vibration.

Fuel tanks, at present employed on lawn mowers and other portable power driven apparatus usually have a filling opening in a wall of the tank, which opening is defined by a simple circular flange fitted with a collar having an inturned flange which provides for the releasable connection of a closure cap by a part rotary bayonet joint action, the cap having a small size air bleed hole in communication with small size channels presented between the inside surface of the cap and diametral arms secured on the inside of the cap and formed so that their extremities are releasably engageable with said inturned collar flange. In some instances, instead of relying upon a bayonet-joint the said flange is screw-threaded and the cap is formed to have screw-threaded engagement therewith.

In connection with the known closure devices, although the closure cap is fitted interiorly with a sealing ring for seating upon the said interned collar flange, the construction and arrangement is such that the interior of the closure cap is almost completely exposed to the filling opening, with the result that fuel splashing or otherwise coming into contact with the interior of the cap is free to escape along said channels and through said air bleed opening.

In an attempt to counteract such escape of the fuel, operatives have resorted to only partially filling the tank, which of course is in itself objectionable since the full tank capacity is not employed and frequent stoppages are necessary for replenishing the fuel supply.

It is an important object of the present invention to overcome the above mentioned objections to the existing tanks and associated closure devices by providing a leakage flow of the contained fuel to the air bleed hole in the applied closure cap is baffled as much as possible.

It is another object of the invention to provide a fuel tank and closure cap in which the filling opening is restricted in size and includes a baffle surface for directing fuel back into the tank and in which the closure cap also includes baffle means capable of directing fuel back into the tank and of limiting as much as possible the chances of the fuel gaining access to the air bleed hole.

A further object of the invention is to provide a fuel tank with an improved construction of filling opening and closure cap which minimises the permitted avenue of escape of fuel to the air bleed hole in the closure cap and enables the tank to be substantially filled with fuel.

Further objects and advantages of the invention, residing in the construction, arrangement and combination of parts will appear clear from consideration of the following description with reference to the accompanying drawings and from the appended claims.

In the drawings,

Figure 1 is a fragmentary view of the wall portion of a fuel tank containing a filling opening defined by a baffle surface according to the invention, which surface not only restricts the filling opening, compared with conventional constructions, but also functions as a fuel escape baffle and deflecting surface, Figure 2 is a similar view to Figure 1 but showing the conventional bayonet joint collar applied around the filling opening, Figure 3 is a similar view to Figure 2 but showing in addition, a conventional closure cap applied over the filling opening and affixed to the bayonet joint collar, Figure 4 is a similar view to Figure 3 but showing the improved closure cap construction according to the invention, Figure 5 is a similar view to Figures 3 and 4 but showing the invention applied to a screw cap closure, and Figure 6 is a similar view to Figure 5 but showing modified construction of screw-on cap suitable for application to the conventional screw-neck tanks.

In the drawings, wherein like parts have been given the same reference numeral, 10 indicates a wall portion of a fuel tank, which tank wall, instead of having the usual enlarged filling opening defined by a simple projecting flange, as indicated by the annular wall 12 of the present construction, is formed with an annular and inwardly directed curved flange 14 which forms an inward extension of the wall 12 and forms a restricted opening 16, which constitutes the filling opening.

The flange 14 is concave on its underneath surface, as shown, and presents a baffle surface to such of the fuel as may contact therewith and from which surface the fuel will be constrained to run-off, or be deflected back into the tank.

In Figure 2, the improved tank opening construction is shown fitted with the conventional bayonet-type collar 18, which is fitted against and around said flange 12 and the inturned flange 20 of which collar is formed to receive, in the manner of a bayonet joint, the extremities of the internal depending and diametral finger portions 22 of a closure cap capable of being releasably fitted over the closure opening 16 and having the main outer cap portion 24, as indicated in Figures 3 and 4, containing the air bleed hole 26.

In Figure 3, in which the conventional closure cap is shown employed in combination with the improved filling opening construction, the channels in communication with the air bleed opening 26 are indicated at 28 and the sealing ring which seats upon the collar 18 is indicated at 30 (said channels and sealing ring being also indicated at 28 and 30, respectively, in Figure 4).

It can be seen, with reference to Figure 3, that even if the baffle surface 14 with the filling opening 16 is employed in association with a conventional closure cap the possibility of escape of fuel along the channels 28 and to the air bleed hole 26 is reduced and baffled by the presence of the inwardly directed and curved flange 14.

In Figure 4 the closure cap is shown provided with an inverted mushroom-like part 32, the stem 34 of which is centrally secured to and depends from the diametral arm structure 22, 22 and the head 36 of which is hollowed-out to present a dome shape concave surface 38 immediately above and completely covering the opening 16 so that the only avenue of escape of the fuel to the channels 28, and hence to the air bleed hole 26 is via the restricted annular space 40 defined between the outer periphery of the part 36 and the baffle flange 14.

In Figure 5 the closure cap is shown with a screw-threaded flange 42 which has screw-threaded engagement with a screw-threaded flange 44 secured around the flange 12' of the baffle surface 14' and the stem 34' of the inverted mushroom part 32' is fitted at the center of a baffle forming disc 46 formed as part of a dish shape washer press fitted at its peripheral flange 48 against the interior of the cap 24' and formed with openings 50 in communication with the air bleed hole 26'.

Figure 6 illustrates a modified construction of screw-on cap suitable for use with conventional fuel tanks having a screw-threaded neck without the baffle flange 14 of the previously described constructions. In Figure 6, 10" indicates the wall of a fuel tank having the conventional screw-threaded neck portion 18" for receiving the screw-threaded flange 42" of the modified screw-on cap 24", similar parts of which, compared with the closure cap according to Figure 5 have been given the same reference numerals in double primes. The modification involves the provision of the sleeve 52 which may be pressed into position between the gasket ring 30" and another gasket ring 54 and which terminates at its outer end, as presented to the tank opening 54, with an inwardly directed inclined and annular baffle flange 54 which takes the place of the previously described baffle flanges 14, 14' and defines with the part 36" the restricted annular space 40". It is to be noted that the construction involved is such as defines a pair of substantially enclosed air chambers 56 and 58 which are in series communication with the air bleed opening 26" and restrict the escape of fuel to said opening.

I claim:

1. In combination, a fuel tank with a filling opening and a removable closure cap for said opening, said opening being defined by an annular flange on said tank wall having a concave interior surface, and the outer periphery of said flange being defined by an upright annular wall outwardly directed with respect to said tank interior, a collar secured against and around said outwardly directed wall, said collar being formed for the releasable affixing of the closure cap over the filling opening, said closure cap having an air bleed opening and having means engageable with said collar for affixing the cap in position over the filling opening, said cap also carrying baffle means opposed to said air bleed hole which baffle means in the affixed condition of the cap is disposed immediately over said annular flange and closes said filling opening except for a restricted annular space defined between the outer periphery of said baffle means and the said annular flange.

2. The invention as defined in claim 1, said baffle means being in the form of an inverted mushroom shape part centrally secured to the cap interior in opposition to said air bleed opening, said part presenting a dome shaped concave surface to the filling opening.

3. In combination, a liquid fuel tank having a filling opening defined by an inwardly and downwardly directed annular flange, a removable baffling and closure structure for said opening having a lower transverse baffle part disposed above and overlying the inner peripheral portion of said flange and disposed in slightly spaced relation thereto to provide a restricted annular opening, said structure having an exterior upper wall with an air bleed opening defined therein, an upper baffle part located below said upper wall and spaced from that portion of said upper wall in which said air bleed opening is defined to provide a chamber, said parts likewise being spaced from each other to define a chamber therebetween, said chambers being in series communication with said air bleed opening.

4. A liquid fuel tank having a filling opening in a wall thereof normally closed by a removable closure cap having an air bleed hole, the wall of said tank adjacent to and defining said opening being in the form of an upright cylindrical portion outwardly directed with respect to the tank interior, said cylindrical portion at its outer end having an integral liquid deflector flange of generally frusto-conical shape extending from said outer end angularly inward toward the tank interior and terminating to define an opening of substantially less diameter than the inner diameter of said cylindrical portion and disposed adjacent the plane of the inner end of said cylindrical portion, said cylindrical portion constituting the mounting structure for the removable closure cap to overlie said opening, a closure cap for said opening having an air bleed hole, said closure cap having internal fuel baffle means defining a restricted annular space with said flange when the cap is applied over said opening, said annular space forming the only avenue of escape of fuel to said air bleed opening when the cap is secured over said opening and mounting structure for said cap embracing said cylindrical portion.

5. A liquid fuel tank having a filling opening in a wall thereof normally closed by a removable closure cap having an air bleed hole, the wall of said tank adjacent to and defining said opening being in the form of an upright cylindrical portion outwardly directed with respect to the tank interior, said cylindrical portion at its outer end having an integral liquid deflector flange of generally frusto-conical shape extending from said outer end angularly inward toward the tank interior and terminating to define an opening of substantially less diameter than the inner diameter of said cylindrical portion and disposed adjacent the plane of the inner end of said cylindrical portion, said cylindrical portion constituting the mounting structure for the removable closure cap to overlie said opening, a closure cap for said opening having an air bleed hole and carrying means opposed to said hole and restricting access of fuel thereto, said means comprising a part fitted within the cap and presenting a dome shaped downwardly directed concave surface to the tank opening when the cap is applied, whereby escape flow of fuel to the air bleed hole is baffled by the presence of said surface and is constrained to flow back into the tank, said concave surface being located above said flange and mounting structure for said cap embracing said cylindrical portion.

References Cited in the file of this patent

UNITED STATES PATENTS

| 995,314 | Abs | June 13, 1911 |
| 1,219,000 | High | Mar. 13, 1917 |
| 1,366,854 | Warren | Jan. 25, 1921 |
| 1,371,669 | Davis | Mar. 15, 1921 |
| 1,587,857 | Reid | June 8, 1926 |
| 1,875,908 | Zarobsky | Sept. 6, 1932 |
| 2,006,752 | Swank | July 2, 1935 |
| 2,145,739 | Shaw | Jan. 31, 1939 |
| 2,279,961 | Whittaker | Apr. 14, 1942 |
| 2,366,428 | Scott | Jan. 2, 1945 |
| 2,739,731 | Hautzenroeder et al. | Mar. 27, 1956 |

FOREIGN PATENTS

| 457,414 | Germany | Mar. 15, 1928 |
| 662,516 | Great Britain | Dec. 5, 1951 |